A. A. LANAUX.
JOURNAL BEARING.
APPLICATION FILED MAR. 26, 1907.

918,453.

Patented Apr. 13, 1909.

2 SHEETS—SHEET 1.

Witnesses
F. C. Gibson.
C. Bradway.

Inventor
Alfred A. Lanaux
By Victor J. Evans
Attorney

A. A. LANAUX.
JOURNAL BEARING.
APPLICATION FILED MAR. 26, 1907.
918,453.
Patented Apr. 13, 1909.
2 SHEETS—SHEET 2.
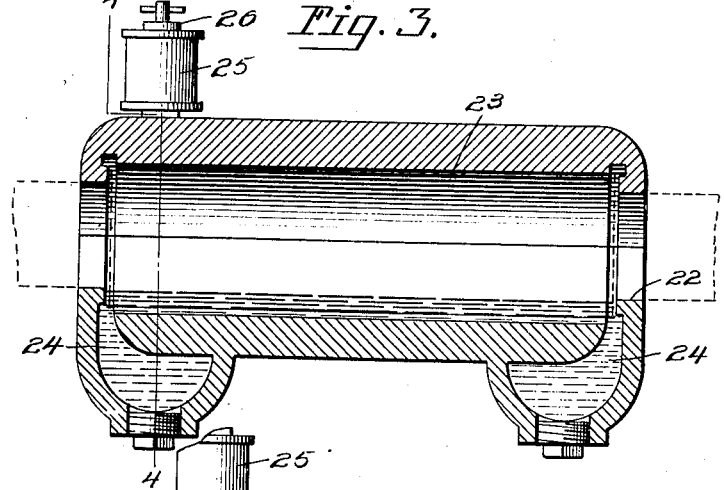
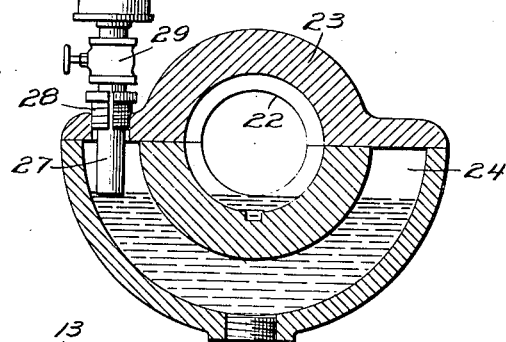
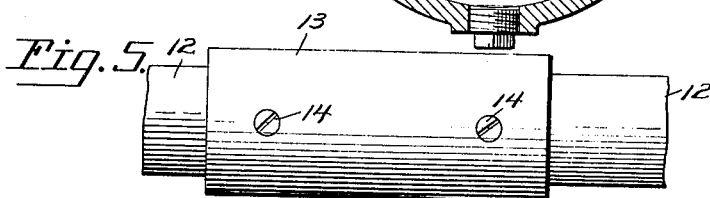
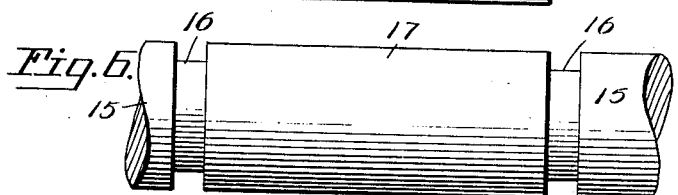
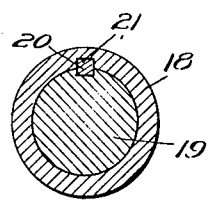
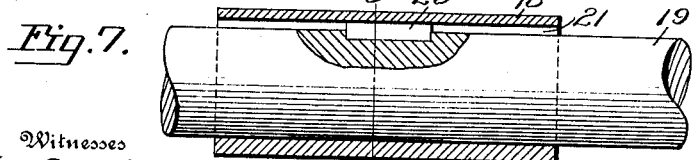
Witnesses
F. C. Gibson.
C. Bradway.
Inventor
Alfred A. Lanaux.
By Victor J. Evans
Attorney

UNITED STATES PATENT OFFICE.

ALFRED A. LANAUX, OF BEAUMONT, TEXAS, ASSIGNOR TO CLARENCE W. G. RARESHIDE, OF HOUSTON, TEXAS.

JOURNAL-BEARING.

No. 918,453. Specification of Letters Patent. Patented April 13, 1909.

Application filed March 26, 1907. Serial No. 364,665.

*To all whom it may concern:*

Be it known that I, ALFRED A. LANAUX, a citizen of the United States, residing at Beaumont, in the county of Jefferson and State of Texas, have invented new and useful Improvements in Journal-Bearings, of which the following is a specification.

This invention relates to journal bearings for line and other shafts.

The invention has for one of its objects to improve and simplify the construction of devices of this character so as to be comparatively easy and inexpensive to manufacture, composed of few parts and thoroughly reliable and efficient in use.

A further object of the invention is the provision of a self-oiling shaft bearing of that type in which a portion of the journal of the shaft is constantly submerged so that the bearing surfaces will be thoroughly lubricated and prevented from heating.

Another object of the invention is to provide a bearing that is effectively protected from grit and other foreign matter and having a lubricating system whereby oil is fed automatically to the bearing and freely circulated therethrough, there being provided chambers into which sediment may be collected, so that the shaft will not cut or grind.

With these objects in view and others, as will appear as the description proceeds, the invention comprises the various novel features of construction and arrangement of parts which will be more fully described hereinafter and set forth with particularity in the claims appended hereto.

Figure 1:
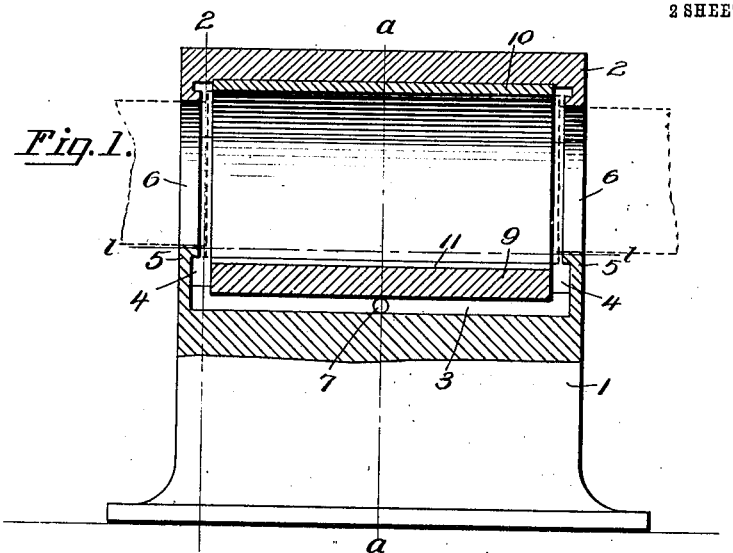
Figure 2:
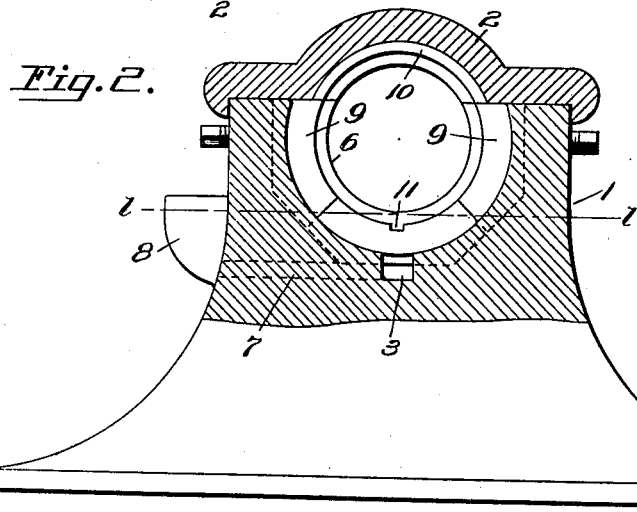
Figure 2A:
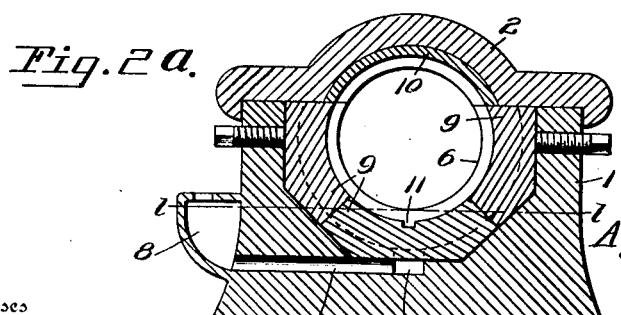

In the accompanying drawings, which illustrate certain of the embodiments of the invention, Figure 1 is a vertical longitudinal section of a stationary bearing. Fig. 2 is a transverse section on line 2—2, Fig. 1. Fig. 2ª is a similar section on line a—a, Fig. 1. Fig. 3 is a vertical longitudinal section of a modified form of journal bearing. Fig. 4 is a transverse section on line 4—4, Fig. 3. Figs. 5 and 6 are side elevations of the journal portions of different forms of shafts. Fig. 7 is a side elevation partly in section of a modified form of shaft. Fig. 8 is a transverse section on line 8—8, Fig. 7.

Referring to the drawings, and more particularly to Figs. 1 to 2ª, the journal box is of that character usually employed in connection with steam engines, dynamos, etc., and comprises a bearing box 1 closed at its top by a cap 2, the box or body portion 1 having a longitudinal passage 3 that communicates at its ends with annular chambers 4 formed in the ends of the body 1 and cap 2. The end walls 5 of the chambers 4 have shaft openings 6 into which a shaft is adapted to have a free working fit. The passage 3 has a central duct 7 that communicates with a reservoir 8 to which is adapted to be connected an automatic lubricant feeding device to be hereinafter more fully explained. In the body or box 1 are bearing brasses 9 of any approved construction that coöperate with the bearing brass 10 of the cap 2 to form the bearing surface for the journal of the shaft. The diameter of the cylindrical bearing formed by the brasses 9 and 10 is somewhat larger than the openings 6. The diameter of the journal is larger than that of the shaft, the latter being substantially the same as the opening 6. By means of the difference in diameters of the cylindrical journal and the opening 6, the level of the oil can be maintained in the journal box to the height of the lowest point of the opening 6, as designated by the level line 1—1, Figs. 2 and 2ª. The central bearing brass 9 has a longitudinal groove 11 through which lubricant can freely pass inwardly from the chambers 4, thereby maintaining a portion of the journal constantly submerged.

Referring to Figs. 5 to 8, inclusive, several forms of journals are shown. The shaft 12 in Fig. 5, may be turned with the cylindrical journal 13 or this journal may be composed of a sleeve applied thereto and keyed in position by screws 14 or other suitable means. By applying a sleeve to line shafts already in use, the present improved bearings may be applied to the apparatus of which the shaft is a part, thus involving little expense in fitting the apparatus with the new bearings. When the shaft is assembled in the bearing shown in Fig. 1, the journal 13 occupies the position represented by dotted lines. It will be noted that the journal is slightly shorter than the distance between the outer walls of the chambers so as to permit free flow of the lubricant to the journal. The journal is lubricated by the oil passing inwardly through the feed groove 11 from the chambers 4 and the lubricant is free to gradually work back into these chambers as the shaft revolves. In the shaft 15 shown in Fig. 6, spaced annular grooves 16 are cut for receiving the end walls 5 of the bearing, the journal 17 taking the place of the sleeve 13 of Fig. 5. Such a journal can be designed for a machine that is built to be used with the present improved journal bearing. In the shaft shown in Figs. 7 and 8, provision is made for longitudinal movement. The journal comprises a sleeve 18 that is feathered to the shaft 19 by a key 20 fixed in either the sleeve or shaft and movable in a keyway arranged in either one of the parts. In the present instance, the journal sleeve 18 has a longitudinal keyway 21 to receive the key that is seated in the shaft. In all of these modifications, the lower portion of the journal is constantly immersed in lubricant since the level of the lubricant in the bearing box is maintained at a height almost on a level with the shaft.

In the bearing shown in Figs. 3 and 4, the main features of construction are substantially the same as the bearing already described and the shaft therein occupies the position indicated by dotted line, Fig. 3. The end openings 22 are of less diameter than the journal bearing surface 23 so as to enable the level of the lubricant to be maintained at such a height as to immerse the bottom portion of the journal in the lubricant. The end walls of the chambers 24 serve to prevent the lubricant from splashing out and to exclude dust and also they form abutments for engaging with the end surfaces of the journal to prevent the latter from moving longitudinally.

The means for supplying lubricant automatically comprises a cup or receptacle 25 having a removable cover 26 whereby the cup is filled. The cup is supported on a feed pipe 27 that extends into the reservoir 8 of Fig. 2ª or into one of the chambers 24 of Figs. 3 and 4 and is adjustably secured in place by a split jam nut 28, there being a cut-off valve 29 included in the feed pipe. The position of the lower end of the feed pipe determines the level of the lubricant in the bearing and it is in practice slightly below the bottom of the circular openings 22 of Figs. 3 and 4 and openings 6 of Fig. 1. The lubricant is adapted to flow by reason of atmospheric pressure and as the level of the lubricant falls below the lower end of the pipe 27, the lubricant will automatically feed to the bearing until the level is restored to normal. In filling the cup or vessel 25, the valve 29 is first closed and the cap 26 taken off. After the filling, the cap 26 is first secured in place and then the valve 29 opened, thereby enabling the lubricant to flow until the normal level is reached.

From the foregoing description, taken in connection with the accompanying drawing, the advantages of the construction and of the method of operation will be readily apparent to those skilled in the art to which the invention appertains. By reason of the construction of the journal and bearing, the parts are thoroughly protected from dust and other foreign matter and no collars are necessary for staying the shaft, since the offset formed by the difference in diameter of the shaft and journal coöperate with the end walls and take the place of the collars usually employed on shafts to prevent longitudinal movement. Yet, where longitudinal movement of the shaft is desired, as for instance, in apparatus having a shaft shown in Fig. 7, the latter can freely move longitudinally, while its journal is completely housed and thoroughly lubricated. Furthermore, by means of the lubricating system, the parts can be uniformly lubricated without waste of lubricant and danger from hot bearings and melting of the metal by friction is overcome.

I have described the principle of operation of the invention, together with the apparatus which I now consider to be the best embodiment thereof, but I desire to have it understood that the apparatus shown is merely illustrative and that such changes may be made when desired, as are within the scope of the claims.

Having thus described the invention, what I claim is:—

1. The combination of a journal box having a horizontal bore and provided with openings at its ends of less diameter than the bore and having a longitudinal channel in the bottom of the bore disposed below the bottoms of the openings, said box having chambers with which the ends of the channel communicate; a shaft having an enlargement disposed within the bore of the journal box, a reservoir formed on the journal box, a conduit having one end connected with the reservoir and provided with branches at the opposite end communicating with the chambers to feed lubricant from the reservoir to the said channel, a source of lubricant, and an adjustable feed connection between the source and reservoir for maintaining a supply of lubricant in the journal box at a level above the channel and below the bottoms of the openings.

2. The combination of a journal box having a horizontal bore and provided with openings at its ends of less diameter than the bore and having a longitudinal channel in the bottom of the bore disposed below the bottoms of the openings, said box having annular chambers with which the ends of the channel are in permanent communication, a shaft having an enlargment disposed within the bore of the journal box, a reservoir formed on the journal box, a conduit permanently communicating with the reservoir and provided with branches leading to and in open communication with the chambers to feed lubricant from the reservoir to the said channel, an air-tight container for lubricant, a pipe supporting at its upper end the container and extending at its lower end into the said reservoir, means for adjusting the pipe to position the lower end thereof at a level between the top of the said channel and bottoms of the openings, and a valve arranged in the pipe.

In testimony whereof, I affix my signature in presence of two witnesses.

ALFRED A. LANAUX.

Witnesses:
O. K. KRANISH,
W. A. MILLER.